Oct. 17, 1967  F. K. MOGENSEN  3,347,368
SCREENING DEVICE
Filed June 28, 1965
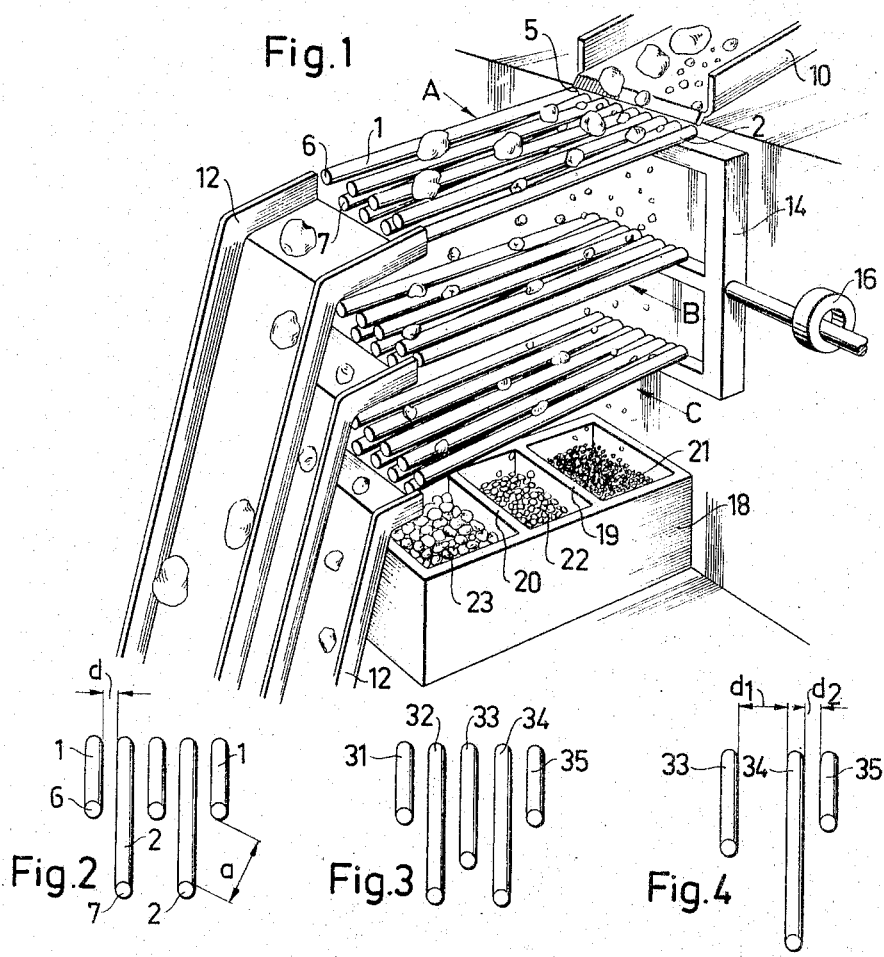
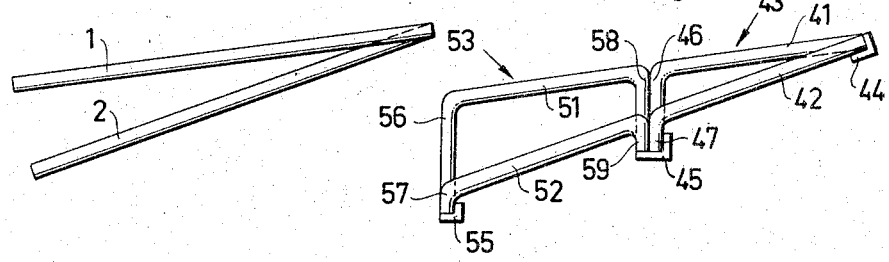
INVENTOR
Fredrik Kristian Mogensen
BY Pierce, Scheffler & Parker
ATTORNEYS

United States Patent Office 3,347,368
Patented Oct. 17, 1967

3,347,368
SCREENING DEVICE
Fredrik Kristian Mogensen, Mjolnartorpsvagen 14,
Djursholm, Sweden
Filed June 28, 1965, Ser. No. 467,518
Claims priority, application Sweden, July 1, 1964,
7,984/64
8 Claims. (Cl. 209—99)

This invention relates to a screening device for classifying a mixture of particles of different sizes.

It is an object of the invention to provide a classifier which is simple in design and cheap in manufacture but is nevertheless effective and capable of sharp separation. It is another object to provide a screening device by which it is possible to classify more or less sticky material which usually clogs conventional classifiers so that they become ineffective. For obtaining these objects and other advantages that will be evident to those skilled in the art the screening device according to the invention comprises at least one deck of substantially unidirectionally extending rods transversally displaced relative one another, said rods being inclined downwardly from their feeding ends to their discharge ends, adjacent rods being shaped and arranged so that the distance between them increases from their feeding ends to their discharge ends, and means below the lowermost deck for separately collecting at least two fractions. The rods must slope at least so much that the goods to be classified moves longitudinally of the rods at least when they are shaken.

According to the preferred embodiment of the invention, however, alternating rods of a deck, such as every second, third or fourth rod, are arranged to form separate series of rods, the rods of each series being located in a common plane, at least one of said common planes being more inclined downwardly than at least one of the other common planes, preferably so as to form a relatively small angle therewith. The rods of one of said series may be more inclined downwardly than the rods of the series comprising at least one of the two rods adjacent a given rod in the first of said series. The angle between two adjacent rods will be determinating for the degree of classification. The smaller the angle is, the slower the free distance between adjacent rods increases and the greater the distance is along which particles below a given size are distributed according to size. Usually the free distance between the lower one and the upper one of two adjacent rods at their discharge ends is not materially greater than preferably about equal to, the free distance between said upper rod and the nearest rod above said lower rod other than said upper rod. The angle between the common planes of any two of said series of rods should in normal cases not be more than 5°, preferably not more than 2°.

The invention will now be described more in detail with reference to embodiments illustrated in the drawing illustrating the invention diagrammatically without limiting its scope.

In the drawings:

FIG. 1 is a perspective view of a three-deck screening device according to the invention, FIGS. 2, 3, and 4 are end views of the rods of one deck of three different hooked at their upper ends so as to agree with the lower ing to FIGS. 1 and 2, and FIG. 6 is a side view of an embodiment in which the deck is subdivided in the length direction of the rods into two sections.

The device according to FIG. 1 comprises three decks A, B, and C each comprising an upper layer of rods 1 located in a common plane and a lower layer of rods 2 located in another common plane. At their feeding ends 5 the rods are situated on a straight line close to each other and at their lower ends, the discharge ends, the ends 6 of the upper layer are at a higher level than the ends 7 of the lower layer as is indicated more clearly in FIG. 2, in which, however, the horizontal distance $d$ between adjacent rods, i.e. the distance between the feeding ends of the rods, is greater than that according to FIG. 1. The free distance between adjacent rods 1 and 2 at their discharge ends 6 and 7 is indicated by $a$. This distance $a$ should be about equal to the horizontal distance between adjacent rods in the upper layer. For practical reasons it may sometimes be a little bit greater. The portion of the rod in which $a$ is greater than the free distance between adjacent rods in the upper layer has no value for the separation because particles greater than said free distance will be removed over the discharge ends of the rods 1.

The goods to be classified are supplied to the uppermost deck A by a flute 10 and the oversized particles are discharged from the discharge ends of the decks to discharge flutes 12, one for each of the decks A, B, and C. The feeding ends 5 of the rods are secured to a frame 14 to which an eccentric or the like 16 is attached for vibrating the rods. Right below the lowermost deck C is a collecting box 18, here provided with partition walls 19 and 20 to form three compartments 21, 22, and 23, for collecting classified particles, the finest being collected in compartment 21 and the coarsest in compartment 23 and a middle size in compartment 22.

The decks A, B, and C are positioned right above one another, but it is also possible to have a lower deck displaced forwardly relative to the deck nearest above. All the decks shown in FIG. 1 are quite similar, but it is possible to use different types of decks. It is often quite sufficient to use only two decks and sometimes a single deck will be quite effective.

In the operation of a device according to FIGS. 1, 2, and 5 the goods are supplied to the upper deck A at the feeding ends 5 of the rods and all particles smaller than the distance between two adjacent rods 1 in the upper layer slide along the rods 2 of the lower layer until the increasing distance between the rods 1 and 2 becomes greater than the particle size. Then the particle drops between the rods and falls upon the next deck B. Deck B may be arranged to make a better separation than deck A. The more spheric the particles are, the sharper classification is obtained.

By the arrangement according to FIG. 1 particles that are so great that they cannot pass between adjacent rods in the upper plane of rods cannot be classified by this deck of rods. According to embodiments shown in FIG. 3 and FIG. 4 it is possible, however, to arrange the rods so as to take care of also such oversized particles. According to these embodiments the rods are arranged in more than two planes, namely in three planes. FIG. 3 shows the discharge ends of five rods 31, 32, 33, 34, and 35. Rods 31 and 35 are located in the uppermost plane and rods 32 and 34 in the lowermost plane, whereas rod 33 is located in an intermediary plane. Particles greater than the free distance between the rods 31 and 35 of the uppermost layer will pass over the deck as oversized particles. Smaller particles will be carried by the intermediate rod 33 and still smaller particles will be carried by a rod 32 or 34 of the lowermost layer, and the particles will fall through the deck of rods as soon as the distance between adjacent rods, such as 32 and 33 is great enough for letting through the particle.

In this arrangement, generally speaking, every second rod together form a first series of rods located in a first common plane, and every second one of the remaining rods together form a second series of rods located in a second common plane, and the rest of said remaining rods together form a third series of rods located in a third common plane, said first common plane being more inclined downwardly than said second and third common planes, one of said second and third common planes being more inclined downwardly than the other.

In the arrangement illustrated in FIG. 3 the horizontal distance between the individual rods is equal. That means that at any given point of the lowermost rods, rod 34 for instance, the distance to adjacent rod 33 or 35 is different. In other words, the distances between two adjacent rods does not increase at the same rate as between next adjacent rods. This means that some particles travelling or sliding on one rod guided by the two adjacent rods will have a greater tendency to move to the one side than to the other side.

This tendency can be controlled by arranging the rods at different horizontal distances from one another as indicated in FIG. 4. In a screen accoring to FIG. 3 a particle sliding on rod 34 downwardly, i.e. against the spectator, will have a greater tendency to move to the left, seen in the direction of movement of the particle. If, however, the rods 33, 34, and 35 are arranged as illustrated in FIG. 4 so that the horizontal distance $d_1$ between rods 33 and 34 is greater than the horizontal distance $d_2$ between rods 34 and 35 this tendency is counteracted. A particle travelling on rod 34 will have a greater tendency from the beginning to move to the right side. The free distances between rods 33 and 34, on the one hand, and between rods 34 and 35, on the other hand, at one given place of rod 34 are more equal than according to the embodiment illustrated in FIG. 3. For given distances between the rods, i.e. for given values of $d_1$ and $d_2$, the tendency to move to the left is as great as to the right. It is possible to arrange the rods so that at one portion of the longitudinal path there is a freater tendency to move towards the one side and at another portion of the path to the other side so that the particle may obtain a staggering movement.

Generally speaking in the embodiment shown in FIG. 4 the rods are arranged so that their projections on one of said common planes are parallel, and the projections of the rods of said first series are situated closer to the projections of the rods of the series whose common plane is less inclined downwardly than to those of the other series.

If the length of the rods is great it may be difficut to fix them sufficiently steadily. Therefore the deck can be subdivided in the length direction of the rods into sections as illustrated in FIG. 6. Adjacent rods 41 and 42 form an upper section 43, the feeding ends of the rods being suported by a bar 44 and the lower ends by a bar 45. The bars are hooked at their lower ends and the vertical leg 46 of the upper rod 41 is greater than that 47 of the lower rod 42, which, in fact, need not be hooked. The lengths of the vertical legs 46 and 47 determine the angle between the rods 41 and 42. Similarly rods 51 and 52 form the lower section 53. The rods are hooked at their discharge ends which are supported by a bar 55, the upper ends of the rods being supported by bar 45. The vertical leg 56 of rod 51 is greater than the vertical leg 57 of the lower rod 52. These rods are also hooked at their upper ends so as to agree with the lower ends of the corresponding rods of the upper section 43, the vertical legs 58 and 59 thus agreeing with the vertical legs 46 and 47, respectively. As a matter of fact, the lower rods 42 and 52 may have no hooks.

In the embodiment illustrated the rods are at right angles to the frame 14 horizontally, but it is possible to have them mounted at a smaller or greater angle thereto.

The dimensions of the rods depend upon the size of the goods to be treated. The term rod does include threads.

For illustrating the invention the following example of a screening will be given.

The screening device had 4 decks, the rods of all of which were 1 m. long. The rods of the uppermost layers had an inclination of 14° to the horizontal. The rods of the two upper decks had a diameter of 10 mm. and those of the two lower decks 8 mm. The horizontal distance between adjacent rods was equal in each deck but decreased from the uppermost to the lowermost deck, being 27 mm. for the uppermost, 12 mm. for the second, 3 mm. for the third and 0 mm. for the lowermost deck. The rods of each deck were arranged in only two planes, the upper ends of the rods being mounted on a straight line and the vertical distance between the discharge ends being about 20 mm. The screen was oscillated at a frequency of 1050 r.p.m. with a stroke of 5.5 mm.

Crushed pouzzolane was subjected to a screening operation in the screening device described in which, however, only the two lower decks were used. Five fractions were collected below the lowermost deck, one for each length of 20 cm. of the entire length of the rods, and one fraction over each of the decks. Altogether seven fractions were thus collected. Each of the fractions as well as the goods fed to the screening device was analysed as to grain size. The distribution of particles of various grain sizes upon the fractions appears from the following table. In the table the column "grain size" indicates the screen aperture of the testing apparatus and the figures in the other colunms indicate the percentage by weight of particles held on each screen, but for the finest fraction (−0.5) which indicates the percentage having passed the finest screen. The columns indicating the seven fractions I–VII show the distribution of the particles in percentage of the total feed indicated in column "Feed." Column fraction III–VI shows the total of said fractions. The figures for "Position" indicate the length position along the rods counted from the feeding end where the border line between the fractions is. The figures for "Screen opening" indicate the effective free distance between the rods at the said positions. That means that even at the end of the rods, at 100 cm., the "screen opening" is only 8.0 mm. because the free opening between adjacent rods in the upper layer of rods, in the lowermost deck, is 8 mm., equal to the thickness of one rod, so that greater particles than 8 mm. cannot pass through the deck.

TABLE

| Grain Size, mm. | Feed, percent | Fractions, Percent of Total Feed ||||||||
| | | Below Lowermost Deck |||||| Over Lower Deck | Over Upper Deck |
| | | Fraction ||||||||
| | | I | II | III | IV | V | VI | VII | III-VI |
| | | Position ||||||||
| | | 0 | 20 | 40 | 60 | 80 | 100 | | |
| | | Screen Opening ||||||||
| | | 0.0 | 0.7 | 3.0 | 6.0 | 8.0 | 8.0 | 14.0 | |
| 50 | | | | | | | | | |
| 30 | 8.0 | | | | | | | 8.0 | |
| 16 | 20.6 | | | | | | 0.6 | 20.0 | 0.6 |
| 8 | 17.4 | | | | 0.2 | 0.2 | 5.3 | 11.7 | 5.7 |
| 4 | 14.9 | | 0.1 | 2.5 | 5.0 | 3.3 | 2.8 | 1.2 | 13.6 |
| 2 | 10.1 | | 0.9 | 6.1 | 2.1 | 0.9 | 0.2 | | 9.3 |
| 1 | 7.6 | | 3.9 | 2.8 | 0.6 | 0.1 | | | 3.5 |
| 0.5 | 6.0 | 0.1 | 4.5 | 1.1 | 0.2 | | | | 1.3 |
| −0.5 | 15.4 | 1.2 | 11.8 | 1.9 | 0.3 | | 0.1 | 0.3 | 2.3 |
| | 100.0 | 1.3 | 21.2 | 14.4 | 8.4 | 4.5 | 9.0 | 41.2 | 36.3 |

What is claimed is:

1. A screening device for classifying a mixture of particles of different sizes into fractions as to size, comprising at least one deck of a plurality of principally uni-directionally extending rods placed side by side and being inclined downwards from their feeding ends to their discharge ends, adjacent rods being differently inclined to the horizontal and each rod being of uniform cross-section so that the distance between them increases from their feeding ends to the discharge ends, and means below the lowermost deck for separatively collecting at least two fractions.

2. A screening device as claimed in claim 1 in which alternating rods of a deck are arranged to form separate series of rods, the rods of each series being located in a common plane, at least one of said common planes being more inclined downwards that at least one of the other common planes.

3. A screening device as claimed in claim 2 in which in a group of three adjacent rods the free distance at the discharge end of one thereof between the discharge ends of the lowermost one and one of the upper ones is not materially greater than the free distance between said upper rods.

4. A screening device as claimed in claim 2 in which the angle between the common planes of any two of said series of rods is not more than 5°.

5. A screening device as claimed in claim 1 in which the feeding ends of all rods in a deck of rods are situated on a substantially straight line.

6. A screening device as claimed in claim 5 in which every second rod together form a first series of rods located in a first common plane, and every second rod of the rest of rods together form a second series of rods located in a second common plane, and all remaining rods together form a third series of rods located in a third common plane, said first common plane being more inclined downwards than said second and third common planes, and said second common plane being more inclined downwards than said third common plane.

7. A screening device as claimed in claim 6, in which the rods are arranged so that their projections on one of said common planes are parallel, and the projections of the rods of said first series are situated closer to the projections of the rods of said third common plane than to those of said second common plane.

8. A screening device as defined in claim 1, in which said rods are supported at their feeding ends and extend freely from said ends to their lowest discharge positions.

References Cited

UNITED STATES PATENTS

| 495,945 | 4/1893 | McDonough | 209—99 X |
| 555,973 | 3/1896 | Risley et al. | 209—99 |
| 1,105,427 | 7/1914 | Hellfach | 209—99 |
| 1,508,416 | 9/1924 | Sheldon | 209—99 |
| 1,747,266 | 2/1930 | Stoltenberg | 209—99 |
| 2,139,046 | 12/1938 | Thys | 209—99 |
| 2,420,941 | 5/1947 | Fies | 209—99 X |

FOREIGN PATENTS

| 983,335 | 6/1951 | France. |

M. HENSON WOOD, Jr., *Primary Examiner.*

ALLEN N. KNOWLES, *Examiner.*